C. E. D. USHER.
TREATMENT OF SANDS OR THE LIKE WITH LIQUIDS.
APPLICATION FILED MAR. 18, 1908.
949,455.
Patented Feb. 15, 1910.
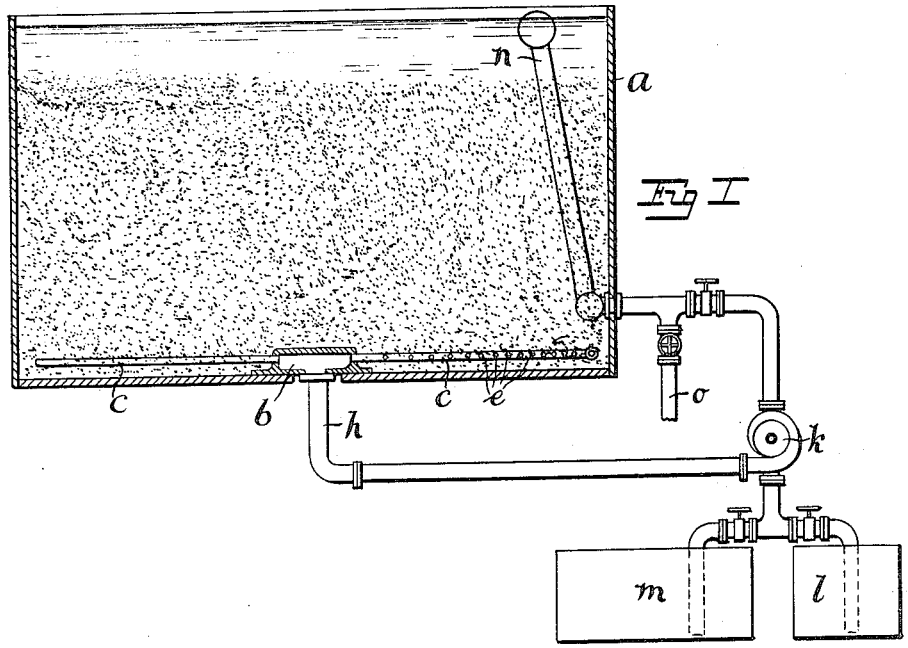
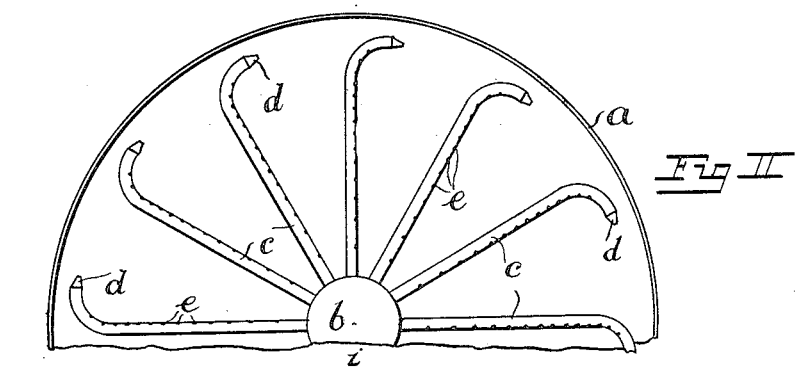
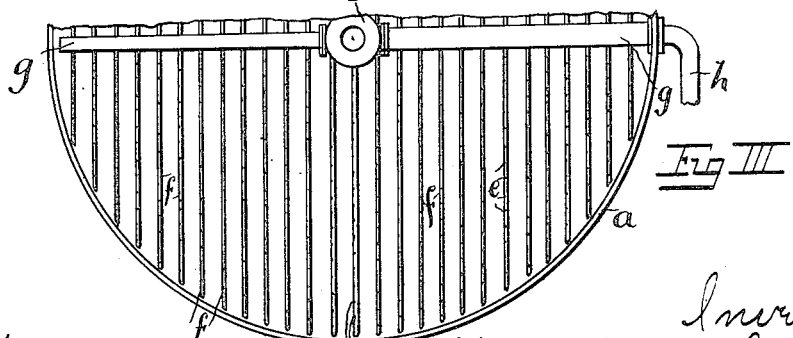
Witnesses
C. Heymann
L. Lang
Inventor
Charles Edwin Draper Usher
by B. Singer Atty.

UNITED STATES PATENT OFFICE.

CHARLES EDWIN DRAPER USHER, OF JOHANNESBURG, TRANSVAAL, ASSIGNOR TO ADAIR-USHER PROCESS LIMITED, OF JOHANNESBURG, TRANSVAAL.

TREATMENT OF SANDS OR THE LIKE WITH LIQUIDS.

949,455.  Specification of Letters Patent.  Patented Feb. 15, 1910.

Application filed March 18, 1908. Serial No. 421,761.

*To all whom it may concern:*

Be it known that I, CHARLES EDWIN DRAPER USHER, assayer, a subject of the King of Great Britain, and residing at 33 Walter Mansions, Eloff street, Johannesburg, Transvaal, have invented certain new and useful Improvements in the Treatment of Sands or the Like with Liquids, of which the following is a specification.

This invention relates to the treatment of comminuted solids by liquids and in particular to the treatment of ores by solvent for the extraction of the metals therefrom.

In the efforts that have been made to accelerate and perfect the treatment of ores, the very finely divided particles, or "slimes," have been successfully treated by suspending them in liquid and gradually displacing said liquid by the introduction of fresh solvent or washing liquid at the bottom of the mass. This method is rendered possible of execution by the extreme fineness of the material in question, which besides rendering flotation a very simple matter also causes the step of actual solution of the metal to be practically instantaneous, the larger part of the treatment time being spent in washing out the solvent liquid. Such process is, however, obviously inapplicable to the larger ore particles which are usually designated as "sands" or "concentrates," since the material belonging to these classes is incapable of suspension in the same manner as slimes and the larger size of the grains renders the metallic contents much less accessible by the solvent. Such materials have therefore been commonly treated by the ordinary vat lixiviation, which is slow and calls for a large and expensive vat plant.

It is the object of the present invention to provide a process whereby sands and concentrates may be treated more rapidly and with better extraction than heretofore.

According to this invention, the treatment liquid is forcibly injected from a number of evenly distributed orifices into the lower part of a mass of ore, in such manner as to cause the individual particles thereof to become substantially separated from one another by the liquid, and also to bring about relative movement between them, accompanied in a greater or less degree by mutual attrition. By this means the liquid is rapidly brought into contact with each individual particle, while at the same time the surfaces of the particles are continuously renewed by the attrition, the softer parts thereof, viz., the metal-bearing pyrites or the metal itself, being most readily rubbed off and thus exposed freely to the action of the liquid. The liquid gradually passes upwardly through the mass carrying the soluble parts of the ore with it and is caused to collect at the surface of the ore; as a rule also it is continuously drawn off and returned for further percolation in the manner described. The solution may either be returned directly or after being passed through a precipitation or other treatment process.

When, as in the cyanid process, aeration is desirable, air is injected either with the liquid or alternately therewith; preferably the former since the whole operation is thereby accelerated.

The accompanying drawing shows apparatus suitable for carrying out the cyanid treatment of sands according to the invention; Figure I being an elevation, Fig. II a partial plan thereof, and Fig. III a partial plan of an alternative construction.

*a* indicates a vat provided with a bottom supply chamber *b*. A number of pipes *c* radiate from the chamber *b*, and lie upon or close to the vat bottom. As shown in Fig. II said pipes are curved at their ends and terminate in nozzles *d*. Along the pipes are formed a series of orifices *e*, which are usually smaller than the nozzles *d*, and are so spaced as to provide as far as possible a uniform feed over the whole vat area. All the nozzles and orifices may be directed horizontally and preferably in the same circumferential direction.

The nozzles may be dispensed with, and the liquid ejected from a number of orifices *e* formed, as in Fig. III, in a number of parallel pipes *f* projecting from a transverse main *g*. This construction permits a central discharge door to be fitted, the liquid inlet pipe *h* being inserted through the side of the vat and the two sections of the main *g* being joined by an annular pipe *i* which gives access to the door beneath it.

Liquid is supplied to the chamber *b* or the main *g* by means of a pump *k* (directly or through an intermediate steady head) capable of delivering liquid at a substantial pressure and having connections to the solution and wash sumps *l* and *m* and to the decanter *n*.

In operation, a charge of sands having been filled into the vat, connection is made between the solution sump $l$ and the pump $k$. The latter is started and the solution thereby injected with considerable force into the mass of sands. The mass quickly fissures and disintegrates, and finally reaches a state of semi-suspension, being thoroughly opened out for the passage of liquid between the individual particles. As soon as a sufficient quantity of liquid has collected at the surface of the mass, the supply from the sump $l$ is shut off and the pump is caused to draw the collected liquid through the decanter $n$. The inlet of the decanter is usually so arranged that a quantity of air is drawn into the pump along with the solution and is subsequently disseminated throughout the vat contents in minute bubbles which materially assist the process of solution. Such circulation and aeration is continued until the gold is dissolved, whereupon water or other washing liquid is injected displacing the remaining gold bearing solution through the pipe $h$, whence it is conducted by pipe $o$ to precipitation boxes in the usual manner. The wash may if desirable be recovered for treatment, by first decanting it down to the level of the settled sands and finally leaching off that which remains in the sands.

What I claim is:—

1. The process of treating material of the nature specified, which consists in forcibly injecting treatment liquid by jets directed from radially arranged orifices into the lower part of a mass of the material under treatment in such manner as to cause substantial separation of the particles by the liquid, and to set up relative movement between them.

2. The process of treating material of the nature specified, which consists in forcibly injecting treatment liquid by symmetrically directed jets only part of which are in alinement, into the lower part of a mass of the material under treatment and thereby setting up a state of agitation of, and mutual attrition between, the particles of liquid.

3. The process of treating sands or the like, which consists in forcibly injecting treatment liquid into the lower part of a mass thereof through apertures which are in close proximity and extend over substantially the entire area of the bottom of the containing vessel in such manner as to cause substantial separation of the particles by the liquid, and to set up relative movement between them.

4. The process of treating sands or the like, which consists in forcibly injecting treatment liquid into the lower part of a mass thereof through apertures which are in close proximity and extend over substantially the entire area of the bottom of the containing vessel and thereby setting up a state of agitation of, and mutual attrition between the particles of the mass.

5. The process of treating material of the nature specified, which consists in forcibly injecting treatment liquid into the lower part of a mass thereof through apertures which are in close proximity and extend over substantially the entire area of the bottom of the containing vessel in such manner as to cause substantial separation of the particles by the liquid, and to set up relative movement between them, causing clear liquid to collect at the surface of the mass, drawing off the same and re-injecting it forcibly into the bottom of the mass.

6. The process of treating material of the nature specified, which consists in forcibly injecting treatment liquid into the lower part of a mass thereof in such manner as to cause substantial separation of the particles by the liquid, and to set up relative movement between them, causing clear liquid to collect at the surface of the mass, so drawing off the same as to include air with it and re-injecting the mixture of liquid and air forcibly into the bottom of the mass.

7. The process of treating material of the nature specified, which consists in forcibly injecting treatment liquid into the lower part of a mass thereof through apertures which are in close proximity and extend over substantially the entire area of the bottom of the containing vessel and thereby setting up a state of agitation of, and mutual attrition between the particles of the mass, causing clear liquid to collect at the surface of the mass, drawing off the same and re-injecting it forcibly into the bottom of the mass.

8. The process of treating material of the nature specified, which consists in forcibly injecting treatment liquid and air into the bottom of a mass thereof in such manner as to cause substantial separation of the particles, and to set up relative movement between them.

In testimony whereof I affix my signature in presence of two witnesses.

CHARLES EDWIN DRAPER USHER.

Witnesses:
ALFRED L. SPOOR,
W. HILLMAN VINCENT.